United States Patent
Quan

(10) Patent No.: US 11,947,425 B2
(45) Date of Patent: Apr. 2, 2024

(54) STORAGE VOLUME SNAPSHOT OBJECT MANAGEMENT

(71) Applicant: Amazon Technologies, Inc., Seattle, WA (US)

(72) Inventor: Shengjie Quan, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 101 days.

(21) Appl. No.: 17/808,265

(22) Filed: Jun. 22, 2022

(65) Prior Publication Data

US 2022/0318097 A1 Oct. 6, 2022

Related U.S. Application Data

(62) Division of application No. 17/085,308, filed on Oct. 30, 2020, now Pat. No. 11,397,645.

(51) Int. Cl.
*G06F 11/14* (2006.01)
*G06F 12/02* (2006.01)

(52) U.S. Cl.
CPC ...... *G06F 11/1451* (2013.01); *G06F 11/1435* (2013.01); *G06F 11/1464* (2013.01); *G06F 11/1469* (2013.01); *G06F 12/0253* (2013.01); *G06F 2201/84* (2013.01)

(58) Field of Classification Search
CPC ...... G06F 3/0605; G06F 3/0644; G06F 3/067; G06F 11/1435; G06F 11/1451; G06F 11/1464; G06F 11/1469; G06F 12/0253; G06F 2201/81; G06F 2201/84; G06F 2212/1044

See application file for complete search history.

(56) References Cited

U.S. PATENT DOCUMENTS

| | | | |
|---|---|---|---|
| 9,170,891 B1 * | 10/2015 | Vincent | G06F 11/1469 |
| 10,248,336 B1 | 4/2019 | Koujalagi et al. | |
| 2017/0097785 A1 * | 4/2017 | Bhoomaraddi | G06F 11/1451 |
| 2019/0034294 A1 * | 1/2019 | Tirado | G06F 11/1448 |
| 2022/0138048 A1 * | 5/2022 | Yelheri | G06F 3/0667 |
| | | | 707/649 |

* cited by examiner

*Primary Examiner* — Larry T MacKall
(74) *Attorney, Agent, or Firm* — Knobbe, Martens, Olson & Bear, LLP

(57) ABSTRACT

Systems and methods for durable storage of storage volume "snapshots" are provided. Snapshots are stored as collections of snapshot data objects. To improve the durability of snapshot storage, physical deletion of snapshot data objects may be delayed for a period of time after the snapshot data objects are marked for deletion. Lists of the stored snapshot data objects and the snapshot data objects that make up active snapshots may be periodically analyzed. If there are any snapshot data objects that are part of active snapshots and are not present in the list of stored snapshot data objects, the snapshot data objects may be recovered before they are physically deleted.

20 Claims, 8 Drawing Sheets

STORAGE VOLUME SNAPSHOT OBJECT MANAGEMENT

CROSS-REFERENCE TO RELATED APPLICATION

This application is a division of U.S. patent application Ser. No. 17/085,308, filed Oct. 30, 2020, which is incorporated by reference herein and made part of this specification.

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

Figure 1:
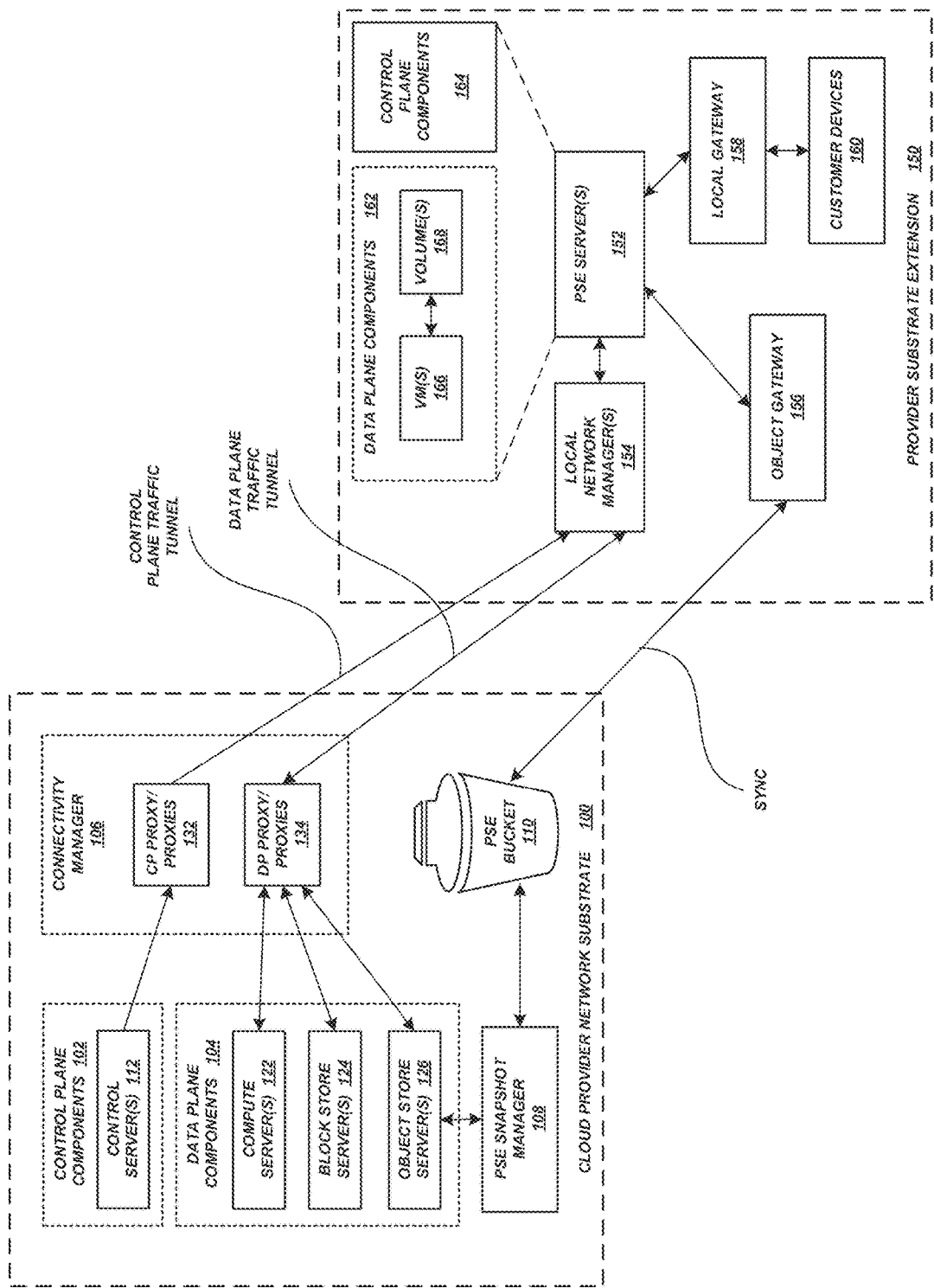
FIG. 1 is a block diagram of an example cloud provider network extended by a provider substrate extension located within a network external to the cloud provider network according to some embodiments.

Generally described, the present disclosure relates to the durable storage of "snapshots" that represent values of every block of a block storage volume or device at a specific point in time. A snapshot may be stored as a set of discrete snapshot data objects, also referred to as "snapshot objects" or "chunks." Under some circumstances, a snapshot object may be erroneously deleted or otherwise lost, such as due to a software bug or a hardware issue. To improve the durability of snapshot storage, a snapshot durability system may delay physical deletion of snapshot objects for a period of time after the snapshot objects are marked for deletion. The snapshot durability system may periodically analyze the stored snapshot objects and the snapshot objects that make up active snapshots. If there are any snapshot objects that are part of active snapshots and are not present in the list of stored snapshot objects, the snapshot durability system may recover those snapshot objects. In this way, erroneously-deleted snapshot objects may be recovered before they are physically deleted from the storage system and potentially permanently lost.

Some snapshot storage systems store both original snapshots and incremental snapshots. An original snapshot may represent values of every block of a block storage volume or device at a first point in time, and an incremental snapshot may represent values of every block of the same block storage volume or device at a second point in time that is subsequent to the first point in time. To reduce total storage requirements for storage of original and incremental snapshots, the storage system may store the incremental snapshot such that the incremental snapshot references any snapshot objects from the original snapshot that remain unchanged from the first point in time to the second point in time. Any block storage portions that have changed from the first point in time to the second point in time are stored as new snapshot objects. For example, the snapshot objects that make up any given snapshot—whether original or incremental—may be specified by a snapshot definition, also referred to as a manifest. The snapshot objects themselves may be stored in a particular storage system, and the manifest may be stored with the snapshot objects (e.g., on the same physical storage devices) or in a separate database of manifests. When an incremental snapshot is created, the manifest for the incremental snapshot may list the objects from the original snapshot (or a prior incremental snapshot) that remain unchanged and are therefore also part of the incremental snapshot. The manifest for the incremental snapshot may also list the new snapshot objects that represent blocks that have changed in the time since the original snapshot (or prior incremental snapshot). Thus, any number of manifests may list the same snapshot object or subset of snapshot objects. This incremental storage method preserves storage space in the snapshot storage by reducing or eliminating the duplicate physical storage of unchanged blocks. However, the sharing of physical snapshot objects among multiple snapshots may lead to issues when snapshots are deleted. When a snapshot is deleted from the snapshot storage system, the snapshot manifest is deleted or otherwise deactivated, and the snapshot objects that are only referenced by that snapshot manifest may be deleted. If the snapshot storage system erroneously determines that a particular snapshot object is not referenced by any other active snapshot manifest (such as a subsequent incremental snapshot), the snapshot object may be erroneously deleted. Such erroneous determinations may have any of a variety of different causes, including software bugs, hardware issues, and the like. The resulting erroneous deletion can cause an irretrievable loss of data that is supposed to be preserved as part of a different active snapshot.

Some aspects of the present disclosure relate to identifying snapshot objects that may have been erroneously deleted or are otherwise not currently stored in an expected location. A snapshot storage system may have a component or subsystem, such as a snapshot durability system, that periodically obtains a first list of all snapshot objects stored in the snapshot storage system and a second list of all snapshot objects that are part of active snapshots. For example, the snapshot durability system may maintain or otherwise access a list of all snapshot objects presently stored in the snapshot storage system. The snapshot durability system may also maintain or otherwise access manifests for all active snapshots that are currently stored in the snapshot storage system. From the manifests, the snapshot durability system may generate or otherwise obtain a list of all snapshot objects that are expected to be stored in the snapshot storage system. The snapshot durability system can analyze the two lists to identify any snapshot objects expected to be stored, but not presently stored, in the snapshot storage system. In some embodiments, the individual snapshot objects may each be associated with unique identifiers, such as object keys. The two lists that are analyzed may be sorted on the keys. In addition, the list of snapshot objects expected to be stored in the snapshot storage system may be de-duplicated because otherwise it may list individual objects multiple times if those snapshot objects are referenced by multiple manifests (e.g., an original snapshot manifest and one or more incremental snapshot manifests). The lists may then be compared to identify missing snapshot objects.

Additional aspects of the present disclosure relate to the delayed deletion of snapshot objects. When a particular snapshot object is deleted, the snapshot storage system may not immediately physically delete the snapshot object such that it is not recoverable. Rather, the snapshot storage system may perform a "soft delete" in which the snapshot object is marked for deletion. For example, the snapshot storage system may update metadata associated with the snapshot object to indicate that the snapshot object is to be deleted and is not available for read/write operations. As another example, the snapshot storage system may update an index of the snapshot storage system to indicate the snapshot object has been deleted or is otherwise not available for read/write operations. The snapshot object may be maintained in this marked-for-deletion state for a period of time, such as n days or weeks (where n is any positive number). Once the marked-for-deletion period expires for a particular snapshot object, the snapshot object may be physically deleted (e.g., immediately deleted, or deleted during a periodically-performed batch deletion process). The marked-for-deletion period of time may be specified to be long enough that the process of analyzing snapshots and identifying/recovering erroneously deleted snapshot objects will be performed a minimum number of times before the snapshot object is physically deleted. In some embodiments, the marked-for-deletion period may be long enough that the process of analyzing snapshots and identifying/recovering erroneously-deleted snapshot objects is performed at least two, three, or more times. In this way, if there is an issue with the recovery process, there is time for it to be performed again prior to physical deletion. For example, the recovery process may be performed daily, and may take half of a day to complete. The marked-for-deletion period may be set to five days, thereby allowing for multiple attempts at detecting and recovering erroneously-deleted objects before they are physically deleted.

Further aspects of the present disclosure relate to use of marked-for-deletion periods and periodic execution of snapshot object recovery processes in a variety of computing environments. In some embodiments, a snapshot storage system may be implemented in a cloud provider network substrate that has a wide variety of computing resources available to external customers, including resources for compute services, storage services, messaging services, and the like. In these cases, the snapshot durability system (or individual components thereof) may also be implemented in the cloud provider network substrate. For some types of applications, such as applications that process a very large amount of data that has to be stored at the customer premises outside the cloud provider network substrate (e.g., for legal compliance, security, minimizing latency in communication with customer devices, etc.), using services that are provided exclusively by hardware located at data centers of the cloud provider may not be optimal. To address these issues, a cloud provider may provide an extension of the cloud provider network substrate to be provisioned within the customer's network. A customer may access their provider substrate extension ("PSE") via the cloud provider network substrate or their own network, and may use the same application programming interfaces ("APIs") to create and manage resources in the PSE as they would use to create and manage resources in the cloud provider network substrate. In such cases, snapshots of the block storage volumes or devices used by the PSE may be stored in the PSE or in the cloud provider network substrate. The snapshot durability system may be implemented in either location—the PSE or cloud provider network substrate—depending upon where the snapshot storage system is implemented, whether the PSE has sufficient computing resources to perform the functions of the snapshot durability system, etc. For example, the snapshot storage system may be located in the PSE, but the PSE may not have sufficient processing capability to perform the analysis of the lists of snapshot objects. In this case, the functionality of the snapshot durability system for analyzing the lists of snapshot objects may be implemented within the cloud provider network substrate. As another example, the PSE may not have sufficient processing capability to perform the analysis of the lists of snapshot objects. In this case, the functionality of the snapshot durability system for analyzing the lists of snapshot objects may be implemented within the cloud provider network substrate.

Various aspects of the disclosure will now be described with regard to certain examples and embodiments, which are intended to illustrate but not limit the disclosure. Although aspects of some embodiments described in the disclosure will focus, for the purpose of illustration, on particular examples of storage data structures, API calls, and object configurations, the examples are illustrative only and are not intended to be limiting. In some embodiments, the techniques described herein may be applied to additional or alternative storage data structures, API calls, encryption protocols, and the like.

Overview of Example Computing Environment with Snapshot Management

With reference to an illustrative embodiment, FIG. 1 shows an example computing environment in which the snapshot management features of the present disclosure may be implemented. As shown, the computing environment includes a cloud provider network substrate 100 (also referred to herein as a "cloud provider network," "provider network," "cloud provider system", or simply as a "cloud" for convenience) and a provider substrate extension 150 (also referred to herein as a "provider network extension" or simply as a "PSE" for convenience) that is a remote extension of the cloud provider network 100. The cloud provider network 100 and the PSE 150 may communicate with each over via an intermediate network (not shown), such as the Internet.

The cloud provider network 100 is a pool of network-accessible computing resources (such as compute, storage, and networking resources, applications, and services), which may be virtualized or bare-metal. The cloud provider network 100 can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example allowing users to have at their disposal scalable "virtual computing devices" via their use of the compute servers 122 (which provide compute instances via the usage of one or both of CPUs and GPUs, optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface (API) refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

A cloud provider network 100 can be formed as a number of regions, where a region is a separate geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Customers can connect to availability zones of the cloud provider network via a publicly accessible network (e.g., the Internet, a cellular communication network). Transit Centers (TC) are the primary backbone locations linking customers to the cloud provider network, and may be co-located at other network provider facilities (e.g., Internet service providers, telecommunications providers). Each region can operate two TCs for redundancy.

The cloud provider network 100 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes customer resources that are implemented on the cloud provider network 100 (e.g., computing instances, containers, block storage volumes, databases, file storage, etc., as described in greater detail below). Data plane traffic generally includes non-administrative operations such as transferring data to and from the customer resources.

The control plane components 102 are typically implemented on a separate set of servers from the data plane components 104, and control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more customers. These compute servers 122 can support a virtualized computing service of the cloud provider network 100. The cloud provider network 100 may offer virtual compute instances with varying computational and/or memory resources. In one embodiment, each of the virtual compute instances may correspond to one of several instance types. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane can also include one or more block store servers 124, which can include persistent storage for storing volumes of customer data as well as software for managing these volumes. These block store servers can support a managed block storage service of the cloud provider network 100. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 100. The object storage servers 126 include one or more servers on which data is stored as objects within resources referred to as buckets, and can be used to support a managed object storage service of the cloud provider network 100. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that can be used to restore volumes.

In some embodiments, a snapshot is a point-in-time block-level backup of a volume, stored as a copy of data on the volume on one or more of the object storage servers 126 (e.g., as a single object or a collection of objects). However, unlike other data stored on the object storage servers 126, snapshots may not be directly accessible within object storage buckets, and instead are accessible through the API of the block store servers 124. In one example, snapshots are implemented as incremental records of data within a volume. Illustratively, when the first snapshot of a volume is taken, all blocks of the volume that contain valid data are copied as one or more objects to the object storage servers 126, and then a snapshot definition or "manifest" file is written to the object storage servers 126 that includes a record of the one or more objects, as well as the blocks of the volume to which each of the one or more objects correspond. Due to the use of incremental snapshots, when the subsequent snapshots are taken of the same volume, only the blocks that have changed since the first snapshot need to be copied to the object storage servers 126, and the manifest can be updated to point to the latest versions of each data block (or a second manifest can be created, enabling the initial manifest to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of computing resource instances to create a "machine image" of that instance stored in the object storage servers 126, and new copies of the instance can be launched from the machine image.

Users can instruct the cloud provider network 100 to create snapshots of their volumes on the block store servers 124 and store the snapshots on the object store servers 126. A snapshot can then be used to create a new volume with information matching the volume captured in the snapshot, for example providing the benefit of feeding the volume data to the new copy without impacting I/O operations at other replicas of the volume. Further, due to the greater redundancy of the object store servers 126 provided in some embodiments, such snapshots may provide a more resilient backup copy of a volume than additional copies stored on the block store servers 124. Another benefit of using a snapshot to create a new volume copy is that it may provide the ability to replicate the volume across availability zones, while the block store servers 124 may only support replication within a given availability zone.

The connectivity manager 106 (including control plane proxies 132 and data plane proxies 134), PSE snapshot manager 108, and PSE bucket 110 depicted in the cloud provider network 100 may be provisioned in a particular region or availability zone of the cloud provider network 100 in response to the creation of a substrate extension 150, and are described in further detail below.

Some customers may desire to use the resources and services of the cloud provider network 100, but for various reasons (e.g., latency in communications with customer devices, legal compliance, security, or other reasons) prefer for these resources and services to be provisioned within their own network, for example on premises of the customer. The technology described herein enables a piece of the cloud provider network—referred to herein as a "provider substrate extension" or PSE 150—to be provisioned within the customer's network. A customer may access their PSE 150 via the cloud provider network 100 or their own network, and may use the same APIs to create and manage resources in the PSE 150 as they would use to create and manage resources in the cloud provider network 100 region.

The PSE 150 may be pre-configured, e.g. by the provider network operator, with the appropriate combination of hardware with software and/or firmware elements to support various types of computing-related resources, and to do so in a manner that mirrors the experience of using the cloud provider network 100. For example, one or more PSE servers 152 can be provisioned by the cloud provider within the customer network. As described above, the cloud provider network 100 may offer a set of predefined instance types, each having varying types and quantities of underlying hardware resources. Each instance type may also be offered in various sizes. In order to enable customers to continue using the same instance types and sizes in their PSE 150 as they do in the cloud provider network 100 region, the PSE server 152 can be a heterogeneous server. A heterogeneous server can concurrently support multiple instance sizes of the same type, and may be also reconfigured to host whatever instance types are supported by its underlying hardware resources. The reconfiguration of the heterogeneous server can occur on-the-fly using the available capacity of the PSE server 152, meaning while other VMs are still running and consuming other capacity of the PSE server 152. This can improve utilization of resources within the PSE 150 by allowing for better packing of running instances on physical hosts, and also provides a seamless experience regarding instance usage across the cloud provider network 100 region and PSE 150.

As illustrated, the PSE servers 152 can host one or more VMs 166. The customer can use these VMs 166 to host containers, which package up code and all its dependencies so an application can run quickly and reliably from one computing environment to another. In addition, the PSE servers 152 may host one or more data volumes 168, if desired by the customer. In the cloud provider network 100 region, such volumes may be hosted on dedicated block store servers 124. However, due to the possibility of having a significantly smaller capacity in the PSE 150 than in the region, it may not provide an optimal utilization experience if the PSE 150 includes such dedicated block store servers. Accordingly, the block storage service may be virtualized in the PSE 150, such that one of the VMs runs the block store software and stores the data of the volume. Similar to the operation of the block storage service in the region, the volumes within a PSE 150 may be replicated for durability and availability. The volumes may be provisioned within their own VPC within the PSE 150. The VMs 166 and any volumes 168 collectively make up the data plane components 162 within the PSE 150 that are an extension of the provider network data plane 162.

The PSE servers 152 may, in some implementations, host certain local control plane components 164, for example components that enable the PSE 150 to continue functioning if there is a break in the connection back to the cloud provider network 100 region. Examples of these components include a migration manager that can move VMs between PSE servers if needed to maintain availability, a key value data store that indicates where volume replicas are located, and a local VM placement component that can respond to requests for new VMs made via the customer network. However, generally the control plane for the PSE 150 will remain in the cloud provider network 100 region, in order to allow the customer to use as much capacity of the PSE 150 as possible. At least some VMs 166 that are set up at the PSE 150, and associated higher-level services that use such VMs 166 as building blocks, may continue to function even during periods of time when connectivity to the provider network data centers is temporarily disrupted in some embodiments.

Server software may be designed by the cloud provider to run on the cloud provider network 100, and this software may be enabled to run unmodified in a PSE 150 by using the local network manager(s) 154 to create a private replica of the cloud provider network 100 within the PSE 150 (the "shadow substrate"). The local network manager(s) 154 can run on PSE 152 servers and bridge the shadow substrate with the customer's on-premise network, for example by acting as a VPN endpoint between the PSE 150 and the proxies 132, 134 provisioned in the cloud provider network 100, and by implementing the mapping service (for traffic encapsulation and decapsulation) to relate data plane traffic (from the DP proxies 134) and control plane traffic (from the CP proxies 132) to the appropriate droplet. By implementing a local version of the provider network's substrate-overlay mapping service, resources in the PSE 150 can seamlessly communicate with resources in the cloud provider network 100 region. In multi-rack PSEs 150, inter-rack communications can go through the local network managers 154, with local network managers 154 maintaining open tunnels to one another. The local network managers 154 may be collocated on the PSE servers 152, may run on a separate card of the PSE server 152 (e.g., an offload card), or can be installed as their own servers separate from the compute hosts. In some implementations, a single local network manager 154 can perform these actions for all hosts in the PSE 150. In other implementations, each host in the PSE 150 may have a dedicated local network manager 154.

PSEs 150 can require secure networking tunnels from the customer network to the cloud provider network 100 in order to operate, for example to maintain security of customer data when traversing an intermediate network, which may be the Internet. These tunnels are composed of virtual infrastructure components including VPCs, CP proxies 132 and DP proxies 134 (which may be implemented as containers running on compute instances), and substrate network interfaces. Every host in a PSE 150 can require at least two tunnels, one for CoAP control plane traffic and one for encapsulated data plane traffic. The connectivity manager 106 manages the cloud provider network 100 region-side lifecycle of these tunnels and their components, for example provisioning them automatically when needed and maintaining them in a healthy operating state.

A control plane (CP) proxy 132 can be provisioned in the cloud provider network 100 to represent particular host(s) in the PSE 150. A CP proxy 132 is an intermediary between the substrate in the cloud provider datacenter and the shadow substrate in the PSE 150. The CP proxy 132 maintains a VPN tunnel to a local network manager 154 in the PSE 150. CP proxies 132 can be implemented as compute instances that have a network interface in the substrate and an additional network interface in a VPC. CP proxies 132 can implement VPN tunnels back to the cloud provider network 100 region, instance traffic NATing to/from customer networks, and participate in the CoAP proxy path. CP proxies 132 provide infrastructure for tunneling management API traffic destined for PSE hosts out of the region substrate and to the remote PSE location. The software implemented within the CP proxies 132 ensures that only well-formed API traffic leaves from and returns to the substrate. CP proxies 132 provide a mechanism to expose remote devices (within a PSE 150 in a customer facility) on the cloud provider substrate, while still protecting substrate security materials (e.g., GIS keys, GTS tokens) from leaving cloud provider datacenters. The one way control plane traffic tunnel imposed by the CP proxies also importantly prevents any (potentially compromised) devices from making calls back to the substrate. CP proxies 132 may be instantiated one-for-one with PSE servers 152, or may be able to manage control plane traffic for multiple PSE servers 152 in the same PSE 150.

A data plane (DP) proxy 134 can also be provisioned in the cloud provider network 100 to represent particular host(s) in the PSE 150. The DP proxy 134 acts as a shadow or anchor of the host, and can be used by services within the cloud provider network 100 to monitor health of the host (including its availability, used/free compute and capacity, used/free storage and capacity, and network bandwidth usage/availability). The DP proxy 134 also allows VPCs to span PSEs and a public region of the cloud provider network 100, by acting as a proxy for the PSE server 152 in the cloud provider network 100 region. Each DP proxy 134 can be implemented as a packet-forwarding compute instance or container. As illustrated, each DP proxy 134 can maintain a VPN tunnel with the local network manager 154 that manages the PSE server 152 that the DP proxy 134 represents. This tunnel can be used to send data plane traffic between the PSE 150 and the cloud provider network 100 region. Data plane traffic flowing between the PSE 150 and the cloud provider substrate can be passed through DP proxies 134 associated with that PSE 150. For data plane traffic flowing from the PSE 150 to the cloud provider substrate, DP proxies 134 can receive encapsulated data plane traffic, validate it for correctness, and allow it to enter into the substrate network. DP proxies 134 can forward encapsulated traffic from the cloud provider substrate directly to the PSE 150. If a DP proxy 134 receives any control plane traffic from the PSE 150, it will drop the traffic so that it does not enter the substrate. Regarding control plane traffic flowing from the region to the PSE 150, DP proxies 134 can delegate non-encapsulated traffic (e.g., control plane traffic) to the appropriate CP proxy 132 based on substrate IP address. Beneficially, this enforces the one-way secure tunnel between the CP proxies 132 and the local network manager 154 for control plane traffic, protecting the cloud provider network 100 against any potentially malicious control traffic flowing in from a PSE 150, but still allowing the customer to send control signals into the PSE 150 via the cloud provider substrate (e.g., to provision VMs 166 in the PSE 150, create volumes 168 in the PSE 150, attach these VMs 166 to these volumes 168, to deprovision any resources in the PSE 150, and to configure networking for PSE resources).

In at least some embodiments, a local network manager 154 may initiate the automated establishment of (or at least participate in the automated establishment of) secure network connectivity with the proxies 132, 134 established at one or more provider network data centers. After connectivity has been established between the local network manager 154 and the proxies 132, 134 at the provider network data center(s), the customer may issue commands to instantiate virtual machines (and/or perform other operations using virtual machines) that use PSE resources, in a manner analogous to the way in which such commands would be issued with respect to virtual machines that use only provider network resources. From the perspective of the customer, the functionality of the cloud provider network 100 may now seamlessly be utilized using local resources within the PSE 150 (as well as resources located in the provider network data centers, if desired). The VMs 166 set up on a PSE server 152 at the provider substrate extension 150 may communicate (e.g., with the help of the network manager 154, which may perform address translation and/or other encapsulation protocol-related processing) both with customer devices 160 located on the customer's computing network in various embodiments, as well as with other VMs that are set up in the provider network data centers, as desired.

A local gateway 158 can be implemented to provide network connectivity between resources running on the PSE servers 152 and customer devices 160 on the customer's network, in order to take advantage of the reduced latency and other benefits of having cloud provider hardware installed in the customer network. The customer can configure the local gateway 158 by issuing API calls to an interface of the cloud provider network 100 which results in control plane commands being sent to the PSE 150. The customer can establish communications between instances hosted by the PSE 150 and the customer devices 160 via the local gateway 158. The local customer devices 160 can include any on-premise or mobile devices that have access to the customer network, for example robotic devices, manufacturing devices, medical equipment, mobile phones, or other computing devices on the customer network.

There may be circumstances that necessitate the transfer of data between the object storage service in the cloud provider network 100 and the PSE 150. For example, the object storage service may store machine images used to launch VMs 166, as well as snapshots representing point-in-time backups of volumes 168. The object gateway 156 can be a provider on a PSE server 152 or a specialized storage device, and provides customers with configurable, per-bucket caching of object storage bucket contents in their PSE 150 to minimize the impact of PSE-region latency on the customer's workloads. The object gateway 156 can also temporarily store snapshot data from snapshots of volumes in the PSE 150 and then sync with the object store servers 126 in the region when possible. The object gateway 156 can also store machine images that the customer designates for use within the PSE 150 or on the customer's premises.

In the manner described above, the PSE 150 forms an edge location, in that it provides the resources and services of the cloud provider network outside of a traditional cloud provider data center and closer to customer devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In some implementations, the data within the PSE 150 may be encrypted with a unique key, and the cloud provider network 100 can limit keys from being shared from the region to the PSE 150 for security reasons. Accordingly, data exchanged between the object store servers 126 and the PSE 150 (e.g., via the object gateway 156 and/or a virtualized block storage service on a PSE server 152 without necessarily using an object gateway 156) may require encryption, decryption, and/or re-encryption in order to preserve security boundaries with respect to encryption keys. The PSE snapshot manager 108 can perform these operations, and a PSE bucket 110 can be created (on the object store servers) to store snapshot and machine image data using the PSE encryption key. In some embodiments, there may be a separate PSE bucket 110 for each separate PSE 150.

Figure 2:
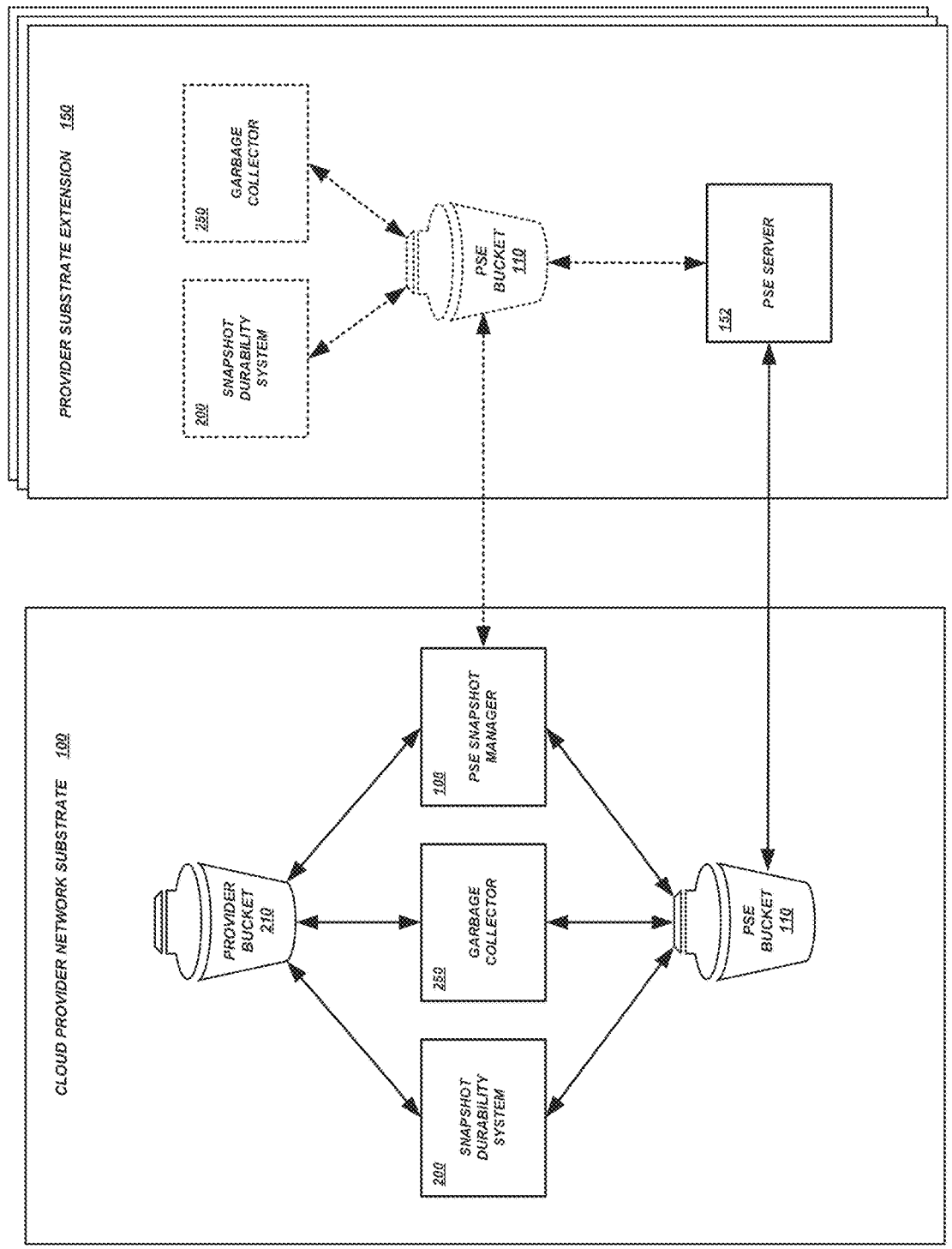
FIG. 2 is a block diagram of illustrative data flows and interactions between components of the cloud provider network and the provider substrate extension according to some embodiments.

FIG. 2 shows various computing environment configurations in which some aspects of the present disclosure may be implemented. Although the configurations may include any or all of the components shown in FIG. 1, many of those components are not shown in FIG. 2 to simplify the illustration of the configurations.

The cloud provider network 100 illustrated in FIG. 2 includes a provider bucket 210 to store one or more snapshots within the cloud provider network 100, and a PSE bucket 110 to store one or more snapshots to be exported to—or imported from—one or more PSEs 150. The PSE snapshot manager 108 of the cloud provider network 100 illustrated in FIG. 2 may include or be associated with a block storage control server (not shown) to manage the provider-side control plane communications to initiate the restoration of a volume or VM from a snapshot. The PSE snapshot manager 108 may also include or be associated with one or more import/export workers (not shown) to implement functionality for exporting a snapshot from the provider bucket 210 to the PSE bucket 110, importing a snapshot from the PSE bucket 110 to the provider bucket 210, and performing any needed encryption, decryption, and/or re-encryption of the snapshot. These components may be implemented on the control plane components 102 and data plane components 104 of the cloud provider network 100.

The PSE 152 server in the PSE 150 illustrated in FIG. 2 may include various components for implementing the functionality described herein. In some embodiments, a PSE server 152 may implement a virtualized block store server (not shown) for restoring VMs 166 and/or volumes 168 from snapshots exported from the cloud provider network 110. The VMs 166 and/or volumes 168 may be restored on the same physical PSE server 152 as the virtualized block store server, or restored on a different physical PSE server 152. The virtualized block store server or some other module or component of the PSE 150 may generate snapshots of VMs 166 and/or volumes 168—whether initial or incremental snapshots—to be sent to and stored at the cloud provider network 100. Examples of restoring, generating, and otherwise dealing with snapshots at a PSE 150 and/or a cloud provider network 100 are described in U.S. patent application Ser. No. 16/698,446, filed Nov. 27, 2019 and titled "Snapshot Management For Cloud Provider Network Extensions," which is incorporated by reference herein.

The cloud provider network 100 may include a snapshot durability system 200 (also referred to as a "snapshot durability subsystem," or simply as a "durability system" for brevity) to manage various durability-related aspects of storing snapshots. The snapshot durability system 200 may handle requests or commands to delete snapshots, determine which data objects are part of snapshots to be deleted, and place the data objects in a to-be-deleted state. Examples of the features provided by the snapshot durability system 200 are described in greater detail below.

The cloud provider network 100 may include a garbage collector 250 (also referred to as a "garbage collection system" or a "garbage collection subsystem") to remove snapshot data objects that are in a to-be-deleted state from the data store in which they are stored (e.g., the PSE bucket 110 and/or provider bucket 210). Examples of the features provided by the garbage collector 250 are described in greater detail below.

The snapshot system 200 and garbage collector 250 may each be implemented on the control plane components 102 and/or data plane components 104 of the cloud provider network 100. For example, the snapshot durability system 200 can garbage collector 250 may be implemented by one or more computing devices configured to execute specific instructions, such as the computing device 800 shown in FIG. 8. In some embodiments, the snapshot durability system 200 and garbage collector 250 may be implemented on the same computing device or on separate computing devices.

In some embodiments, a PSE 150 may include its own PSE bucket 110. This configuration is illustrated in FIG. 2 using dotted lines. In this configuration, one or more snapshots may be stored locally within the PSE 150. The snapshots may be synchronized to/from the cloud provider 100 as desired or needed. For example, when a data volume or VM is to be restored from a snapshot, a request may be sent to the cloud provider network 100. The requested snapshot may be obtained from the provider bucket 210 by the PSE snapshot manager 108 and provided to the PSE bucket 110 for use by the PSE 150. The mechanism by which the snapshot is stored, any encryption is applied to the snapshot, and other snapshot generation or restore operations are performed may be similar or identical to a configuration in which the PSE bucket 110 is located on the cloud provider network 100. However, the PSE bucket 110 is physically located in the PSE 150 instead. In some embodiments, snapshots may not automatically be synchronized to and/or from the cloud provider network 100, but rather the snapshots may be maintained primarily or exclusively in the PSE 150.

To provide the snapshot durability and garbage collection features described herein, the snapshot durability system 200 and garbage collector 250 may be implemented within the PSE 150 when the PSE bucket 110 is also implemented within the PSE 150. In this configuration, the snapshot durability system 200 and garbage collector 250 may each be implemented on the control plane components 164 and/or data plane components 162 of the PSE 150. In some embodiments, the computing device 800 shown in FIG. 8 may be implemented located in the PSE 150.

Example Processes for Managing Snapshot Deletion and Durability

Figure 3:
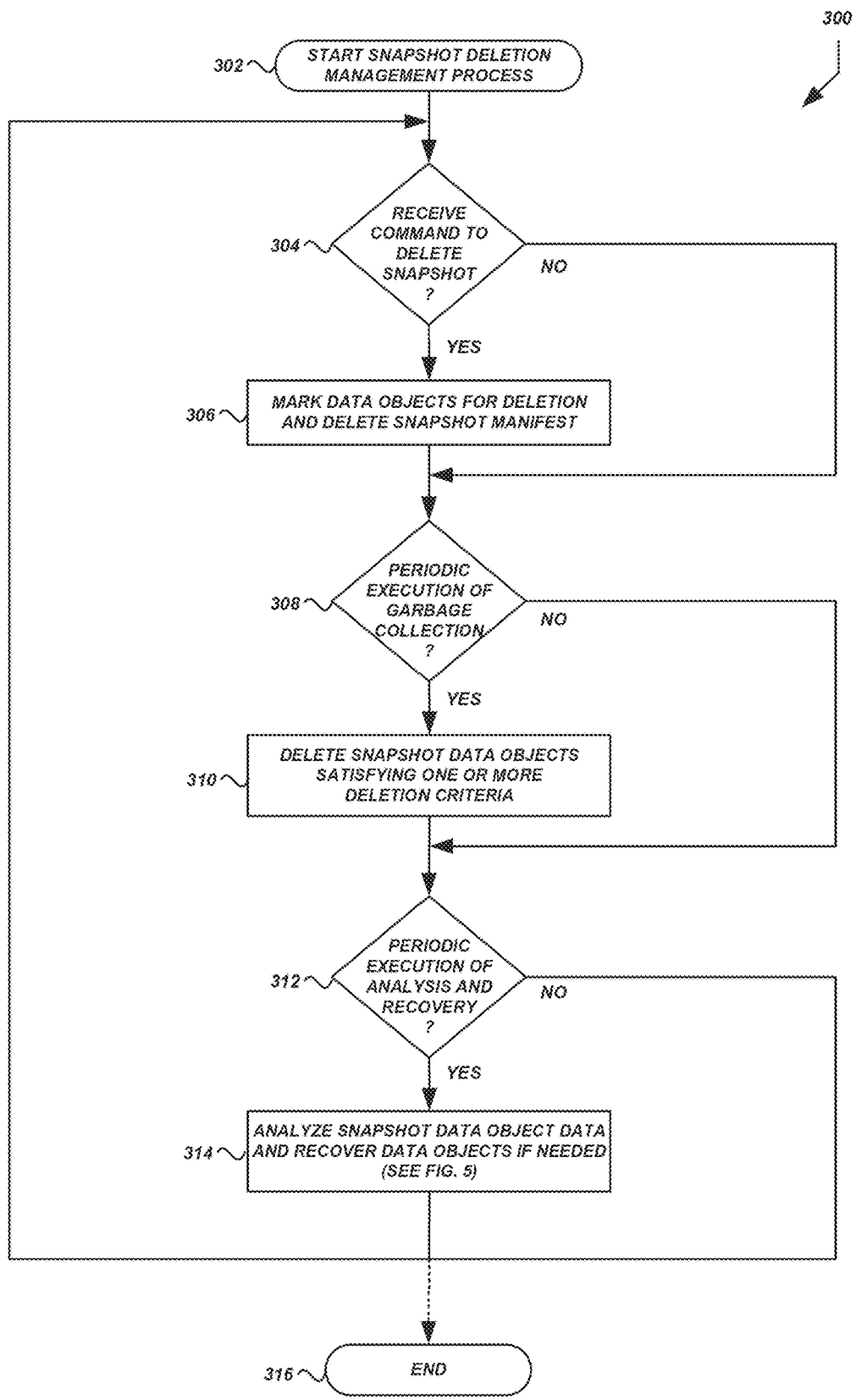
FIG. 3 is a flow diagram of an illustrative process for managing deletion of snapshots according to some embodiments.

As described above, a snapshot may be a point-in-time block-level backup of a volume, stored as a set of discrete snapshot data objects in one or more buckets or other object data stores. In some embodiments, each snapshot data object may be a standard size—or may be variable up to a maximum size—measured in units of storage (e.g., 512 kilobytes, 1 megabyte, etc.). The snapshot may be defined by a manifest that specifies the snapshot data objects that make up the snapshot. The snapshot manifest may be stored in the same object data store as the snapshot data objects, or in a different data store. At certain times and/or in response to certain events, a snapshot may need to be deleted. FIG. 3 illustrates a process 300 that may be performed by various components of the cloud provider network 100 and/or PSE 150 (depending upon the location of the bucket or other object data store) to manage the deletion of snapshots. Advantageously, the process 300 includes operations and features that allow for recovery of erroneously-deleted snapshot data objects, thereby improving the durability of snapshot storage.

The process 300 beings at block 302. In some embodiments, the process 300 may begin when the snapshot durability system 200 and/or garbage collector 250 begin operation. Portions of the process 300 will be described with reference to the example subsystems and interactions illustrated in FIG. 4.

At decision block 304, the snapshot durability system 200 or some other module or component of the cloud provider network 100 or PSE 150 may determine whether a command has been received to delete a snapshot. In some embodiments, the command may be received as an API request from a customer responsible for the snapshot. In some embodiments, the command may be received as an API request automatically generated based on one or more snapshot retention criteria. If a command to delete a snapshot has been received, the process 300 may processed to block 306. Otherwise, if no command to delete a snapshot has been received, the process 300 may proceed to decision block 308.

At block 306, the snapshot durability system 200 or some other module or component of the cloud provider network 100 or PSE 150 may execute one or more operations for deleting the snapshot to be deleted. The snapshot durability system 200 may retrieve, receive, or otherwise access the manifest for the snapshot to be deleted, and determine the snapshot data objects that collectively make up the snapshot. These snapshot data objects may make up an initial set of snapshot data objects to be deleted, along with the manifest itself. However, rather than simply deleting the snapshot data objects referenced by the manifest, the snapshot durability system 200 may temporarily place the snapshot data objects in a to-be-deleted state in which the data objects are not available to be accessed outside of the object data store, but are not physically deleted from object data store. In this way, snapshot data objects that are erroneously deleted may be easily recovered.

To place the snapshot data objects in a to-be-deleted state, the snapshot durability system 200 may perform one or more operations. In some embodiments, the snapshot durability system 200 may update metadata that is part of or otherwise associated with individual snapshot data objects. For example, the snapshot durability system 200 may set a flag indicating to-be-deleted status, add a to-be-deleted marker, or the like. The snapshot durability system 200 may also or alternatively add a timestamp or other temporal indictor of when the snapshot data object was placed in to-be-deleted status and/or when it may be deleted.

Figure 4:
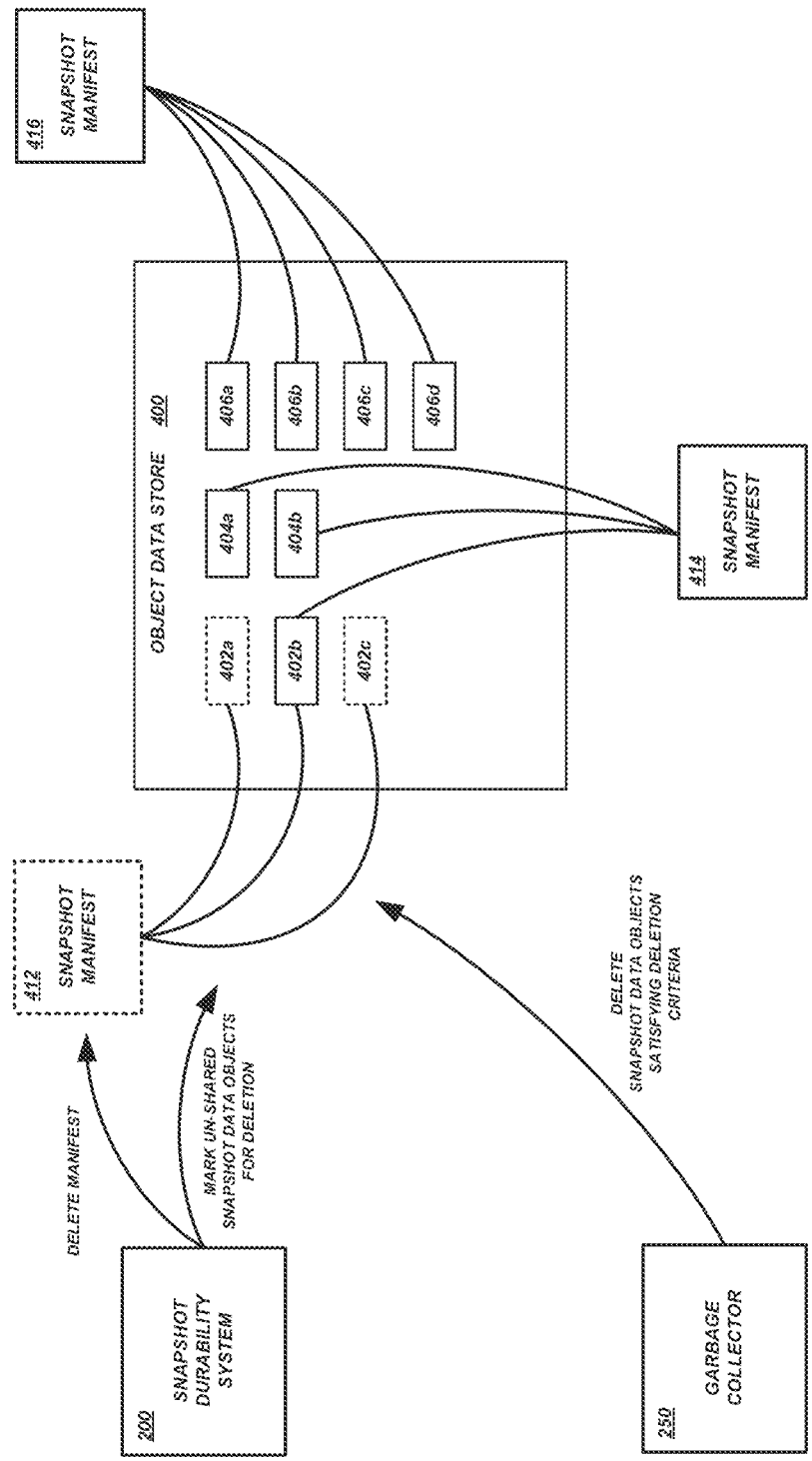
FIG. 4 is a block diagram of an illustrative object data store showing deletion of snapshot data objects according to some embodiments.

In some embodiments, other snapshots that are not to be deleted may also include one or more of the same snapshot data objects as the snapshot to be deleted. For example, FIG. 4 illustrates an object data store 400 with snapshot data objects that make up three different snapshots: a snapshot defined by snapshot manifest 412, a snapshot defined by snapshot manifest 414, and a snapshot defined by snapshot manifest 416. Snapshot manifest 412 may define an original snapshot including a plurality snapshot data objects 402a, 402, and 402c. The data volume represented by the original snapshot may have later been modified, either after the original snapshot is restored, or without restoring the original snapshot. Subsequently, an incremental snapshot may have been generated to represent the modified state of the data volume. However, even though the data volume has been modified, one or more portions of the modified data volume may be unmodified and may therefore be identical to the corresponding portion(s) of the data volume represented by the original snapshot. In such cases, to conserve computing resources (e.g., storage space, network bandwidth, etc.), the snapshot data objects that represent the unchanged portions of the data volume may also be assigned to the incremental snapshot: the same physical data stored within the bucket is referenced by multiple manifests, rather than duplicated each time a snapshot is generated and the corresponding portions(s) of the data volume remain unified. For incremental snapshots only snapshot data objects representing modified portions of the data volume may be created and stored in the object data store 400. Thus, the incremental snapshot manifest for the incremental snapshot may reference both the snapshot data objects representing modified portions of the data volume (snapshot data objects 404a and 404b in the illustrated example) and the snapshot data objects from the original snapshot representing unchanged portions of the data volume (snapshot data object 402b in the illustrated example). The snapshot data objects from the prior snapshot, representing unchanged portions of the data volume, may be referred to as shared snapshot data objects to highlight their membership in snapshot data object collections of multiple active snapshots.

Shared snapshot data objects may be identified as such in one or more ways. In some embodiments, a shared snapshot data object may be identified as such within the manifests that reference the shared snapshot data object, such as by use of a flag or other metadata. In some embodiments, a shared snapshot data object may be associated with metadata of its own (e.g., outside of a snapshot manifest) that identifies the snapshot data object as shared, such as by use of a flag, a reference counter indicating the number of active snapshots to which the data object belongs, or other metadata. When the snapshot durability system 200 is temporarily placing the snapshot data objects in a to-be-deleted state, the snapshot durability system 200 may inspect metadata that is indicative of the shared or not-shared status of the snapshot data objects. For any snapshot data objects that are determined to be shared, the snapshot durability system 200 may not place those snapshot data objects in the to-be-deleted state. In some embodiments, the snapshot durability system 200 may also update metadata to reflect a change in shared status, if any. For example, a reference counter may be decremented, or a shared flag may be changed if the snapshot data object is only referenced by the manifest of one active snapshot.

In some embodiments, shared snapshot data may not be specifically identified as such. Instead, the snapshot durability system 200 may determine whether each snapshot data object that is part of the snapshot to be deleted is referenced by a manifest of another active snapshot. The snapshot durability system 200 may inspect manifests of other active snapshots, execute a query or API call to determine whether individual snapshot data objects are referenced by other active manifests, execute a query or API call to return all snapshot data objects of the snapshot to be deleted that are referenced other active manifests, and/or perform some other operation to identify shared snapshot data objects that are not to be placed in a to-be-deleted state. In some embodiments, instead of the durability system identifying snapshot data objects that are shared, the durability system 300 may execute a query or API call to return only the non-shared snapshot data objects that are part of the snapshot for which a delete command has been received.

In the example illustrated in FIG. 4, snapshot durability system 200 may place snapshot data objects 402a and 402c in the to-be-deleted state, as indicated by the dotted outlines. The snapshot durability system 200 may exclude any shared snapshot data objects from being marked for deletion. In the illustrated example, shared snapshot data object 402b is not placed in the to-be-deleted state, as indicated by the solid outline. Snapshot data objects stored in the object data store 400 for other snapshots, such as snapshot data objects 406a, 406b, 406c, and 406d referenced by snapshot manifest 416 may also not be placed in the to-be-deleted state unless a request to delete the corresponding snapshot is received.

At decision block 208, the snapshot durability system 200 may determine whether periodic execution of the garbage collector 250 is to occur. In some embodiments, execution of the garbage collector 250 may be triggered a predefined period of time after a previous triggering of the garbage collector 250, a predefined period of time after previous execution of the garbage collector 250 has completed, according to a predetermined or dynamically determined schedule, or in response to some other event. If execution of the garbage collector 250 is triggered, the process 300 may processed to block 310. Otherwise, if execution of the garbage collector 250 has not been triggered, the process 300 may proceed to decision block 312.

At block 310, the garbage collector 250 may execute. The garbage collector 250 may be configured to analyze the snapshot data objects that are present in the object data store 400 and also in a to-be-deleted state, and determine whether the snapshot data objects satisfy one or more deletion criteria. In some embodiments, a deletion criterion may be based on a length of time that the snapshot data objects have been in the to-be-deleted state. For example, a deletion threshold period of time may be defined in terms of a quantity of units of time, such as 12 hours, 4 days, 1 week, or the like. For each such snapshot data object, the garbage collector 250 may access a timestamp or other temporal indicator associated with the to-be-deleted state. If the snapshot data object has been in the to-be-deleted state for longer than the deletion threshold period of time, the garbage collector 250 may delete the snapshot data object. If the snapshot data object has not been in the to-be-deleted state for the deletion threshold period of time, the garbage collector 250 may not delete the snapshot data object, and instead leave the snapshot data object in the to-be-deleted state The analysis may be performed for each snapshot data object in the object data store 400, or for some subset thereof. In the example illustrated in FIG. 4, the garbage collector 250 may determine whether snapshot data objects 402a and 402c satisfy the deletion criteria and, if so, delete the snapshot data objects 402a and 402c.

Deletion of a snapshot data object may involve one or more operations that result in a substantially permanent loss of the data represented by the snapshot data object, or in a substantially permanent loss of the ability to access the data represented by the snapshot data object. For example, deletion of a snapshot data object may involve overwriting the snapshot data object, obfuscating the snapshot data object, returning the storage location at which the snapshot data object is stored to a pool of available storage, removing a pointer or metadata for the snapshot data object from an index of the object data store 400, etc.

At decision block 312, the snapshot durability system 200 may determine whether periodic execution of an analysis and recovery process is to occur. Advantageously, an analysis and recovery process may be performed to analyze whether all snapshot data objects that make up active snapshots are present in an object data store, and to attempt recovery of any such snapshot data objects that are not present in the object data store. In some embodiments, execution of an analysis and recovery process may be triggered a predefined period of time after a previous triggering of the analysis and recovery process, a predefined period of time after previous execution of the analysis and recovery process has completed, according to a predetermined or dynamically determined schedule, or in response to some other event. If execution of the analysis and recovery process is triggered, the process 300 may processed to block 314. Otherwise, if execution of the analysis and recovery process has not been triggered, the process 300 may proceed to block 316 or return to another block of process 300, such as decision block 304.

At block 314, the snapshot durability system 200 may execute an analysis and recovery process. In some embodiments, the snapshot durability system 200 may execute the analysis and recovery process shown in FIG. 5 and described in greater detail below.

The process 300 may in some embodiments terminate at block 316. Termination of the process may occur according to a schedule, or in response to an event such as the termination of execution of the snapshot durability system 200.

Figure 5:
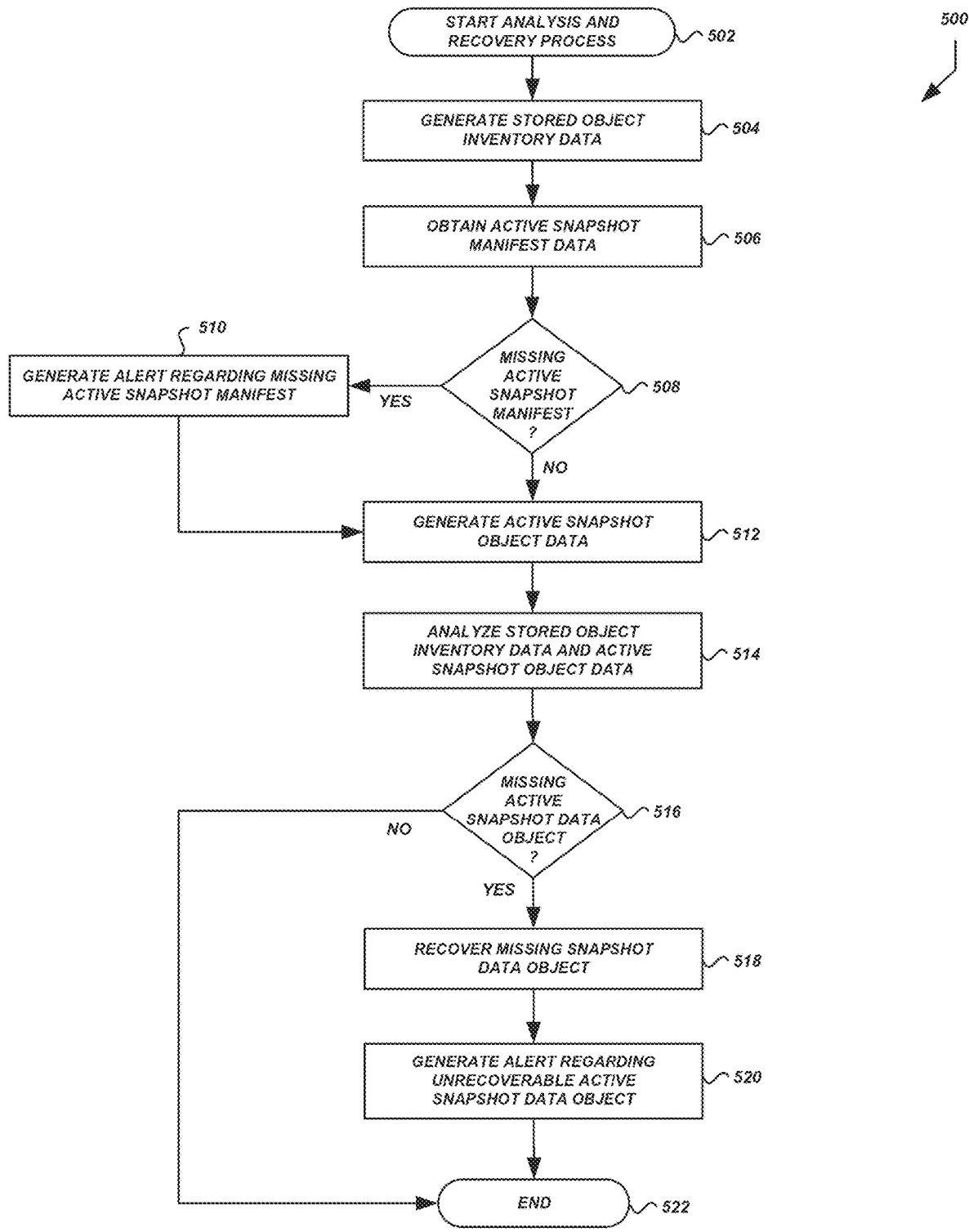
FIG. 5 is a flow diagram of an illustrative process for analyzing data regarding active snapshots and an object data store, and recovering missing snapshot data objects according to some embodiments.

Turning now to FIG. 5, an example analysis and recovery process 500 will be described. The process 500 beings at block 502. In some embodiments, the process 500 may begin in response to an event, such as when block 314 of process 300 is reached. Portions of the process 500 will be described with reference to the example subsystems and interactions illustrated in FIGS. 6 and 7.

Figure 6:
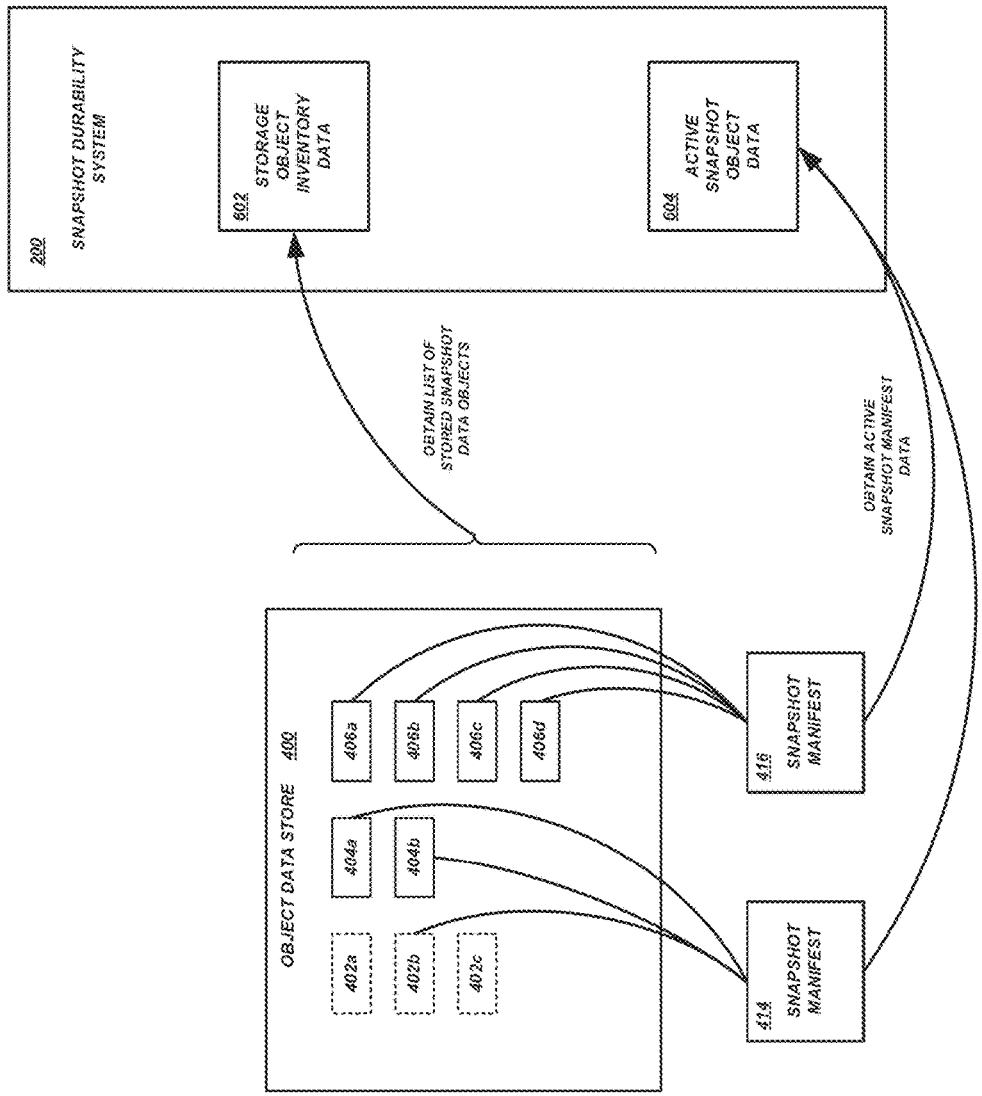
FIG. 6 is a block diagram of illustrative data flows and interactions between components of an object data store and a snapshot durability system during analysis of storage data according to some embodiments.

At block 504, the snapshot durability system 200 or some other module or component of the cloud provider network 100 or PSE 150 may generate storage data representing the inventory of snapshot data objects that (1) are currently stored in the object data store 400 and (2) are not in a to-be-deleted state. FIG. 6 shows an example embodiment in which the snapshot durability system 200 obtains inventory data from the object data store 400 and performs any desired data processing (e.g., standardization, reformatting, compression). The snapshot durability system 200 generates stored object inventory data 602 representing the inventory of snapshot data objects that are currently stored in the object data store 400 and are not in a to-be-deleted state. In the illustrated example, the stored object inventory data 602 may represent snapshot data objects 404a, 404b, 406a, 406b, 406c, and 406d, as indicated by the solid outlines of those snapshot data objects. Snapshot data objects 402a, 402b, and 402c are in a to-be-deleted state as indicated by the dotted outlines of those snapshot data objects, and may therefore be excluded from the stored object inventory data 602.

To generate the stored object inventory data 602, the snapshot durability system 200 may make an API request to the object data store 400 for the inventory. The object data store 400 may return a data stream or file listing the snapshot data objects (e.g., unique identifiers of the snapshot data objects). For example, the object data store 400 may return a comma separated value ("CSV") file listing data regarding all snapshot data objects that are not in a to-be-deleted state in the object data store (e.g., identifiers, assigned snapshots, etc.). In some cases, the snapshot durability system 200 may use the file to generate a compressed columnar representation of the list of snapshot data objects (e.g., a "Parquet" file) that may be more efficient to use in the processing performed during subsequent steps of the process 500. As another example, the object data store 400 may provide the inventory already compressed (e.g., generated using a lossless compression algorithm such as "gzip"). In some embodiments, the inventory provided by the object data store 400 may include snapshot manifest inventory data listing all snapshot manifests currently stored in objected data store 400 in addition to the listing of snapshot data objects.

At block 506, the snapshot durability system 200 can obtain active snapshot list data listing all active snapshots that have (or are expected to have) snapshot data objects stored in the object data store 400. In some embodiments, the listing of active snapshots may be maintained by, and obtained from, a data source that is separate from the object data store 400. For example, a separate snapshot management data store may be part of, or accessible to, the snapshot durability system 200. When a new snapshot is created, it may be tracked with the active snapshots tracked by the snapshot management data store. When a snapshot is deleted, it may be removed from the active snapshots tracked by the snapshot management data store.

At decision block 508, the snapshot durability system 200 can determine whether there are any missing snapshot manifests for active snapshots. To determine whether there are any missing snapshot manifests, the snapshot durability system 200 may analyze the active snapshot list data, representing the active snapshots, with respect to the snapshot manifest inventory data that represents the inventory of snapshot manifests currently stored. If there are any active snapshots whose snapshot manifests are missing from the inventory, then the process 500 may proceed to block 510. Otherwise, if no snapshot manifests for active snapshots are missing, the process 500 may proceed to block 512.

In some embodiments, the snapshot durability system 500 may maintain a listing of active snapshots whose manifests are known to be missing, and for which the process 500 is not to proceed to block 510. For example, there may be one or more active snapshots listed in the active snapshot list data without a corresponding snapshot manifest being stored in the object data store 400. This may be an intentional scenario that is intended as a quality control check to make sure that the snapshot durability system 200 does indeed detect at least one missing snapshot manifest. In this case, the process 500 may proceed to block 512 without first proceeding to block 510.

At block 510, the snapshot durability system 200 may generate an alert in response to determining that there is a missing snapshot manifest for an active snapshot. The alert may be generated to a system operator as a visual, textual, and/or auditory alert. In some embodiments, the process 500 may pause to allow remedial action to be taken, or to receive a command to continue the process 500. In some embodiments, the alert may be logged instead of, or in addition to, being presented to a system operator, and the process 500 may proceed to block 512 without pausing.

At block 512, the snapshot durability system 200 may generate storage data representing the snapshot data objects referenced by the manifests of active snapshots. FIG. 6 shows an example embodiment in which the snapshot durability system 200 obtains active snapshot manifest data from the object data store 400. Using the active snapshot management data, the snapshot durability system 200 generates active snapshot object data 604. The active snapshot object data 604 may represent snapshot data objects 402*b*, 404*a*, 404*b*, 406*a*, 406*b*, 406*c*, and 406*d*, as indicated by the lead lines to active snapshot manifests 414 and 416. Snapshot data objects 402*a* and 402*c* are not associated with any active snapshot manifests, and may therefore be excluded from the active snapshot object data 604.

To generate the active snapshot object data 604, the snapshot durability system 200 may obtain the snapshot manifests for all active snapshots. The snapshot durability system 200 may parse or otherwise read the manifests, determine the snapshot data objects referenced by each manifest, and add data regarding the referenced snapshot data objects to a list. In some embodiments, the data added to the list may include an identifier of the snapshot data object, a storage location of the snapshot data object, an identifier of the snapshot to which the snapshot data object belongs, other information, or some combination thereof. In some embodiments, the snapshot durability system 200 may de-duplicate the list of snapshot data objects. For example, some active snapshots may share snapshot data objects, such as when an incremental snapshot includes changes to only a subset of the snapshot data objects of the original snapshot or a prior snapshot. In such cases, the manifest for the incremental snapshot may reference any unchanged snapshot data objects from one or more prior snapshots, and any new snapshot data objects that represent data changed and included for the first time in the incremental snapshot. To more efficiently perform processing in subsequent steps of the process 500, the snapshot durability system 200 may de-duplicate the list of snapshot data objects.

Figure 7:
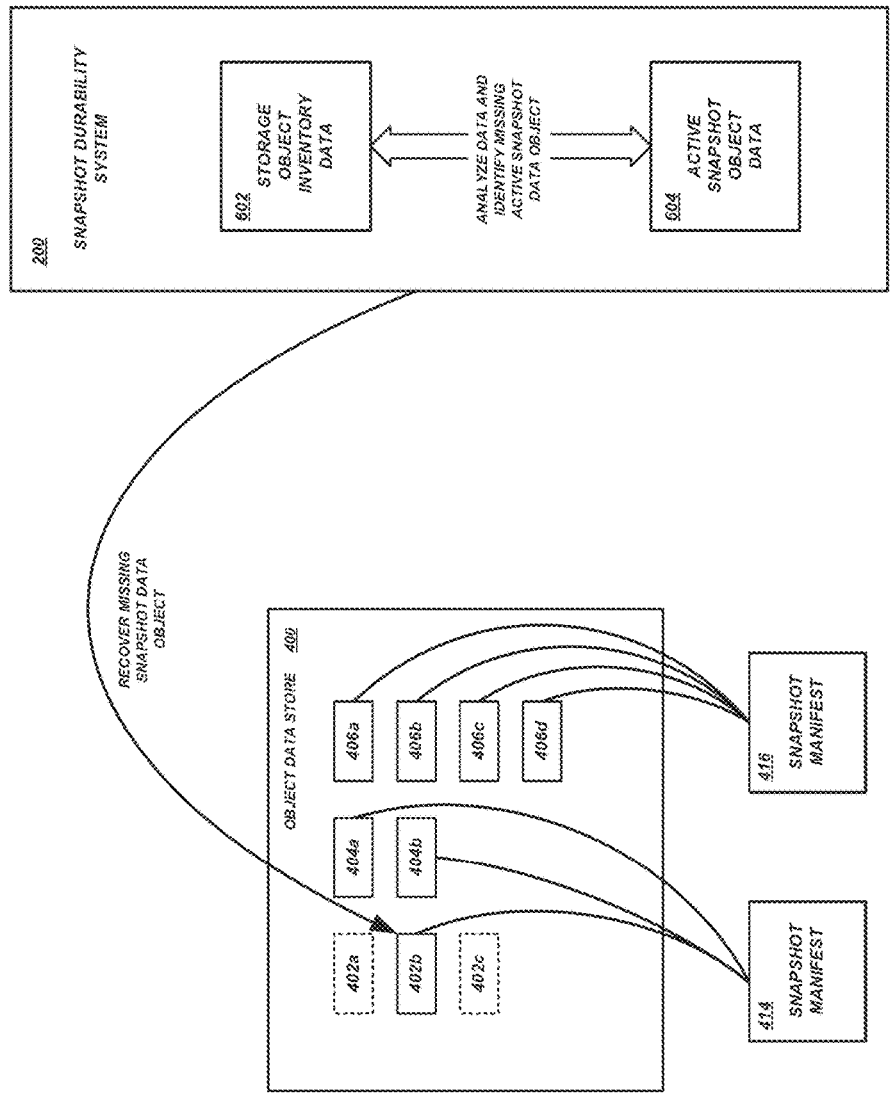
FIG. 7 is a block diagram of illustrative data flows and interactions between components of an object data store a snapshot durability system during snapshot object recovery according to some embodiments.

At block 514, the snapshot durability system 200 may analyze the storage data generated above (e.g., first storage data representing the inventory of snapshot data objects currently stored in the object data store and second storage data representing the snapshot data objects referenced by the manifests of active snapshots) to determine whether any snapshot data objects expected to be stored in the object data store 400 may be missing. FIG. 7 shows an example embodiment in which the snapshot durability system analyzes first storage data—stored object inventory data 602—with respect to second storage data—active snapshot object data 604. The first storage data representing the inventory of snapshot data objects currently stored in the object data store may be compared with the second storage data representing the snapshot data objects referenced by the manifests of active snapshots item-by-item. In some embodiments, the first storage data and second storage data may be analyzed using a MapReduce algorithm in which a sorted list of snapshot data objects referenced by manifests of active snapshots and expected to be stored in the object data store 400 is compared to a sorted list of snapshot data objects presently in the object data store.

At decision block 516, the snapshot durability system 200 may determine, based on the analysis performed above at block 514, whether any snapshot data objects expected to be stored in the object data store 400 are missing. If so, the process 500 may proceed to block 518. Otherwise, if no snapshot data objects are missing, the process 500 may terminate at block 522. In the example illustrated in FIGS. 6-7, the process 500 may proceed to block 518 based on snapshot data object 402*b* being present in the active snapshot object data 604 but missing from the stored object inventory data 602.

In some embodiments, the snapshot durability system 500 may maintain a listing of active snapshots with snapshot data objects known to be missing, and for which the process is not to proceed to block 518. This may be an intentional scenario that is intended as a quality control check to make sure that the snapshot durability system 200 does indeed detect at least one missing snapshot data object. In this case, if there are no other snapshot data objects missing, the process 500 may terminate at block 522 without first proceeding to block 518.

At block 518, the snapshot durability system 200 may attempt to recover the missing snapshot data object(s) identified above. FIG. 7 shows an example embodiment in which snapshot data object 402*b* is in a to-be-deleted state as indicated by the dotted lines, but which is part of an active snapshot and referenced in active snapshot manifest 414. Illustratively, snapshot data object 402*b* may have been a shared snapshot data object that was erroneously placed in a to-be-deleted state when another snapshot was deleted, such as the snapshot defined by snapshot manifest 412 in FIG. 4. Recovery of a missing snapshot data object such as snapshot data object 402*b* may include updating metadata that is part of or otherwise associated with the missing snapshot data object to change it from a to-be-deleted state to an active state. For example, the snapshot durability system 200 may reset a flag that indicates the snapshot data object is in the to-be-deleted state. As another example, the snapshot durability system 200 may remove a to-be-deleted marker that has been added to the snapshot data object.

If the snapshot durability system 200 is unable to recover a missing snapshot data object, the snapshot durability system 200 may mark the corresponding snapshot as lost, or add the snapshot to a quality control to be used as a quality control test as described above.

At block 520, the snapshot durability system 200 may generate an alert for any missing snapshot data objects for active snapshots that were unable to be recovered above. The alert may be generated to a system operator as a visual, textual, and/or auditory alert. In some embodiments, the alert may be logged instead of, or in addition to, being presented to a system operator.

Figure 8:
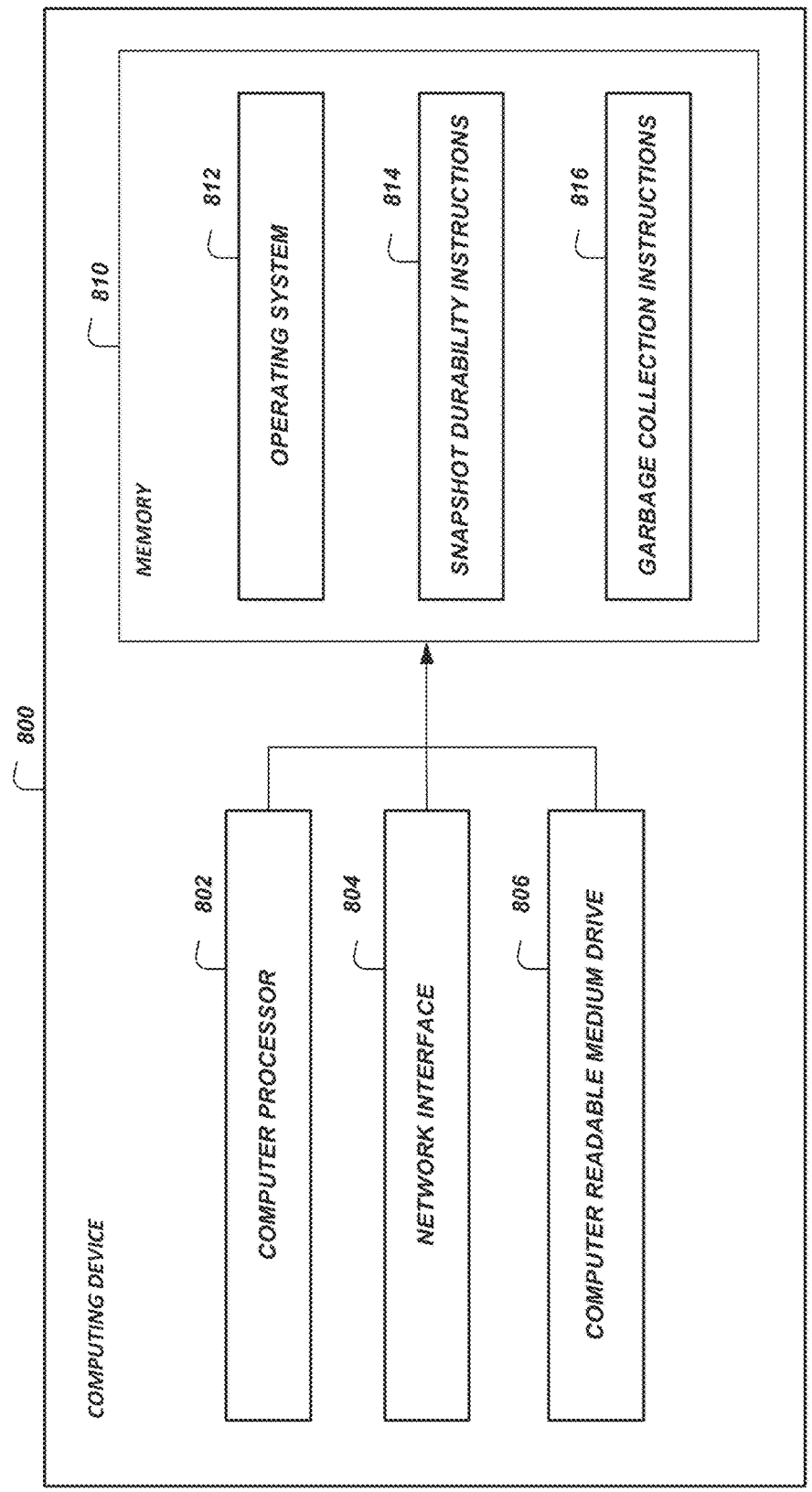
FIG. 8 is a block diagram illustrating components of a computing device configured to execute processes for snapshot data object garbage collection and snapshot durability management according to some embodiments.

FIG. 8 illustrates the various components of an example computing device 800 configured to implement various functionality of the snapshot durability system 200 and/or garbage collector 250. In some embodiments, as shown, the computing device 800 may include: one or more computer processors 802, such as physical central processing units ("CPUs"); one or more network interfaces 804, such as a network interface cards ("NICs"); one or more computer readable medium drives 806, such as a high density disk ("HDDs"), solid state drives ("SDDs"), flash drives, and/or other persistent non-transitory computer-readable media; and one or more computer readable memories 810, such as random access memory ("RAM") and/or other volatile non-transitory computer-readable media.

The computer readable memory 810 may include computer program instructions that one or more computer processors 802 execute in order to implement one or more embodiments. The computer readable memory 810 can store an operating system 812 that provides computer program instructions for use by the computer processor(s) 802 in the general administration and operation of the computing device 800. In some embodiments, the computer readable memory 810 can further include computer program instructions and other information for implementing aspects of the present disclosure. For example, in one embodiment, the computer-readable memory 810 may include snapshot durability instructions 814 for implementing features of the snapshot durability system 200, garbage collection instructions 816 for implementing features of the garbage collector 250, etc.

When processes 300 or 500 are initiated, a corresponding set of executable program instructions stored on a computer readable medium drive 806 may be loaded into computer readable memory 810 and executed by one or more computer processors 802. In some embodiments, the processes 300 and 500—or portions thereof—may be implemented on multiple computing devices and/or multiple processors, serially or in parallel.

Terminology and Additional Considerations

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied in a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of a computing system comprising one or more computing devices configured to execute specific instructions,
generating first storage data representing a first subset of stored snapshot data objects stored in an object data store, wherein the first subset of stored snapshot data objects are available for restoring one or more data volumes, and wherein a second subset of stored snapshot data objects stored in the object data store are not available for restoring the one or more data volumes;
generating second storage data representing a plurality of active snapshot data objects, wherein individual active snapshot data objects of the plurality of active snapshot data objects are assigned to one or more active data volume snapshots of a plurality of active data volume snapshots;
analyzing the first storage data with respect to the second storage data;
identifying, based on results of analyzing the first storage data with respect to the second storage data, an active snapshot data object of the plurality of active snapshot data objects, wherein the active snapshot data object is absent from the first subset of stored snapshot data objects, and wherein the active snapshot data object is present in the second subset of stored snapshot data objects; and
modifying data associated with the active snapshot data object to indicate that the active snapshot data object is available for restoring one or more data volumes.

2. The computer-implemented method of claim 1, wherein modifying the data associated with the active snapshot data object comprises one of: removing data marking the active snapshot data object for deletion, or adding the active snapshot data object to an index of the object data store.

3. The computer-implemented method of claim 1, wherein generating the first storage data comprises:
   executing an application programming interface ("API") call to the object data store, wherein the API call comprises a request for a list of snapshot data objects stored in the object data store and available for restoring one or more data volumes; and
   receiving, from the object data store, the list of snapshot data objects stored in the object data store and available for restoring one or more data volumes, wherein each stored snapshot data object of the second subset of stored snapshot data objects are marked for deletion from the object data store.

4. The computer-implemented method of claim 3, wherein generating the first storage data further comprises generating a compressed columnar representation of the list of snapshot data objects stored in the object data store and available for restoring one or more data volumes, wherein the first storage data comprises the compressed columnar representation.

5. The computer-implemented method of claim 1, wherein generating the second storage data comprises:
   obtaining a plurality of snapshot manifests, wherein individual snapshot manifests of the plurality of snapshot manifests comprise data referencing one or more snapshot data objects associated with an active data volume snapshot of the plurality of active data volume snapshots, and wherein a first snapshot manifest and a second snapshot manifest of the plurality of snapshot manifests both comprise data referencing a same active snapshot data object; and
   generating a de-duplicated list of the plurality of active snapshot data objects based on the plurality of snapshot manifests.

6. The computer-implemented method of claim 5, wherein generating the second storage data further comprises generating a compressed columnar representation of the de-duplicated list of the plurality of active snapshot data objects, wherein the second storage data comprises the compressed columnar representation.

7. The computer-implemented method of claim 5, further comprising:
   determining, based on a list of active snapshots, that an active snapshot manifest is missing from the plurality of snapshot manifests; and
   generating an alert regarding the active snapshot manifest.

8. The computer-implemented method of claim 1, wherein analyzing the first storage data with respect to the second storage data comprises comparing a first sorted list of the first subset of stored snapshot data objects stored in the object data store to a second sorted list of the plurality of active snapshot data objects.

9. The computer-implemented method of claim 1, further comprising:
   updating metadata associated with a first snapshot data object stored in the object data store to indicate that the first snapshot data object is to be deleted; and
   determining, after a threshold period of time and based at least partly on the metadata associated with the first snapshot data object, to delete the first snapshot data object from the object data store.

10. The computer-implemented method of claim 9, further comprising performing the analyzing the first storage data with respect to the second storage data a plurality of times during the threshold period of time.

11. A system comprising:
   computer-readable memory storing executable instructions; and
   one or more processors configured by the executable instructions to at least:
      obtain first storage data representing a first subset of stored snapshot data objects stored in an object data store, wherein the first subset of stored snapshot data objects are available for restoring one or more data volumes, and wherein a second subset of stored snapshot data objects stored in the object data store are not available for restoring the one or more data volumes;
      obtain second storage data representing a plurality of active snapshot data objects, wherein individual active snapshot data objects of the plurality of active snapshot data objects are assigned to one or more active data volume snapshots of a plurality of active data volume snapshots;
      identify an active snapshot data object, of the plurality of active snapshot data objects, that is absent from the first subset of stored snapshot data objects and present in the second subset of stored snapshot data objects; and
      modify data associated with the active snapshot data object to indicate that the active snapshot data object is available for restoring one or more data volumes.

12. The system of claim 11, wherein the one or more processors are configured by further executable instructions to at least:
   execute an application programming interface ("API") call to the object data store, wherein the API call comprises a request for a list of snapshot data objects stored in the object data store and available for restoring one or more data volumes;
   receive, from the object data store, the list of snapshot data objects stored in the object data store and available for restoring one or more data volumes, wherein each stored snapshot data object of the second subset of stored snapshot data objects are marked for deletion from the object data store; and
   generate a compressed columnar representation of the list of snapshot data objects stored in the object data store and available for restoring one or more data volumes, wherein the first storage data comprises the compressed columnar representation.

13. The system of claim 11, wherein the one or more processors are configured by further executable instructions to at least:
   obtain a plurality of snapshot manifests, wherein individual snapshot manifests of the plurality of snapshot manifests comprise data referencing one or more snapshot data objects associated with an active data volume snapshot of the plurality of active data volume snapshots, and wherein a first snapshot manifest and a second snapshot manifest of the plurality of snapshot manifests both comprise data referencing a same active snapshot data object;
   generate a de-duplicated list of the plurality of active snapshot data objects based on the plurality of snapshot manifests; and
   generate a compressed columnar representation of the de-duplicated list of the plurality of active snapshot data objects, wherein the second storage data comprises the compressed columnar representation.

14. The system of claim 13, wherein the one or more processors are configured by further executable instructions to at least:
   determine, based on a list of active snapshots, that an active snapshot manifest is missing from the plurality of snapshot manifests; and
   generate an alert regarding the active snapshot manifest.

15. The system of claim 11, wherein the one or more processors are configured by further executable instructions to at least:
   update metadata associated with a first snapshot data object stored in the object data store to indicate that the first snapshot data object is to be deleted; and
   determine, after a threshold period of time and based at least partly on the metadata associated with the first snapshot data object, to delete the first snapshot data object from the object data store.

16. The system of claim 15, wherein the one or more processors are configured by further executable instructions to at least analyze the first storage data with respect to the second storage data a plurality of times during the threshold period of time.

17. The system of claim 16, wherein to analyze the first storage data with respect to the second storage data, the one or more processors are configured by further executable instructions to at least compare a first sorted list of the first subset of stored snapshot data objects stored in the object data store to a second sorted list of the plurality of active snapshot data objects.

18. The system of claim 11, wherein to modify the data associated with the active snapshot data object, the one or more processors are configured by further executable instructions to remove data marking the active snapshot data object for deletion.

19. The system of claim 11, further comprising a garbage collection subsystem configured to at least:
   determine that a threshold period of time has passed; and
   delete a first snapshot data object of the first subset of stored snapshot data objects based on metadata associated with the first snapshot data object indicating the first snapshot data object is to be deleted after the threshold period of time, wherein the first snapshot data object is absent from a second list of active snapshot data objects.

20. The system of claim 19, wherein the garbage collection subsystem is further configured to delete a snapshot manifest referencing the first snapshot data object based on second metadata associated with the snapshot manifest indicating the snapshot manifest is to be deleted after the threshold period of time.

* * * * *